(12) United States Patent
Saha et al.

(10) Patent No.: US 10,614,387 B2
(45) Date of Patent: Apr. 7, 2020

(54) METHOD FOR CREATING A PROCESS NOMENCLATURE

(75) Inventors: Debanjan Saha, Mohegan Lake, NY (US); Ramendra K. Sahoo, Mohegan Lake, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 2664 days.

(21) Appl. No.: 12/023,089

(22) Filed: Jan. 31, 2008

(65) Prior Publication Data

US 2009/0198720 A1     Aug. 6, 2009

(51) Int. Cl.
*G06Q 10/00* (2012.01)
*G06Q 10/06* (2012.01)

(52) U.S. Cl.
CPC .................................. *G06Q 10/06* (2013.01)

(58) Field of Classification Search
CPC ..................................................... G06Q 10/06
USPC ..................................................... 705/1–14
See application file for complete search history.

(56) References Cited

U.S. PATENT DOCUMENTS

| | | | | |
|---|---|---|---|---|
| 7,203,881 B1 * | 4/2007 | Williams et al. | | 714/741 |
| 7,206,751 B2 * | 4/2007 | Hack et al. | | 705/7.11 |
| 7,617,159 B1 * | 11/2009 | Donner | | 705/67 |
| 2002/0072956 A1 * | 6/2002 | Willems | | G06Q 10/04 705/7.31 |
| 2005/0005266 A1 * | 1/2005 | Datig | | 717/136 |
| 2006/0107265 A1 * | 5/2006 | Schulz | | G06Q 10/06 718/100 |
| 2007/0244910 A1 * | 10/2007 | Mital | | G06Q 10/10 |
| 2007/0282576 A1 * | 12/2007 | Butine | | G06Q 10/06 703/6 |
| 2008/0120129 A1 * | 5/2008 | Seubert | | G06Q 10/06 705/35 |

OTHER PUBLICATIONS

Supply Chain Council, Reference Model, 1999, SCOR, 1, p. 20, p. 31.*

* cited by examiner

*Primary Examiner* — Hafiz A Kassim
*Assistant Examiner* — Zahra Elkassabgi
(74) *Attorney, Agent, or Firm* — Ryan, Mason & Lewis, LLP

(57) ABSTRACT

Techniques for creating a nomenclature to represent one or more groups within a process are provided. The techniques include obtaining a process, wherein the process comprises one or more groups, and creating a nomenclature to represent the one or more groups, wherein the nomenclature facilitates usability of the process in at least one of an operation and design environment. Techniques are also provided for generating a database of one or more processes, wherein each process is represented by a nomenclature.

3 Claims, 4 Drawing Sheets

METHOD FOR CREATING A PROCESS NOMENCLATURE

FIELD OF THE INVENTION

The present invention generally relates to information technology, and, more particularly, to enterprise processes.

BACKGROUND OF THE INVENTION

Information technology (IT) service procedures are typically captured as enterprise processes. Each enterprise process can have several tasks and sub-processes. Documents, charts, tools and/or role players can be associated with the tasks. IT services as enterprise processes are not necessarily optimized to accommodate the constantly changing enterprise needs of new types of customers and their requirements. Emergence of new enterprise demands and fast changing technology impose time and resource challenges to meet the market demands. The enterprise processes advantageous should be competitive and optimized to provide a return on investment (ROI) within a very short span of time with minimal resource utilization.

Existing approaches include various inefficiencies. For example, existing enterprise processes (termed as best practices) are certainly not "the best" representation of the processes, with inadequate information available for a wide variety of processes. Also, several similar processes are termed as different processes due to targeted customer needs, thus leading to each process representing a customized process assembly line.

Existing approaches can also include static processes (with a combination of series of tasks) that make process enrichment, leading to process optimization and standardization of a process, quite complex and labor intensive. Static organization of processes with inadequate knowledge representation leads to difficulties in locating and duplicating tasks with different names and/or with a wide variety of inputs, outputs and association with other tasks.

Existing approaches do not include a standard naming convention or mechanism that would lead to discovery of the nature of a process or task without knowing the details of the process or task. Productivity in an enterprise environment, including accelerated ramping into operations through effective training, are process-dependent. A process name should advantageously be self-explanatory towards its usability within the context of a process chain.

SUMMARY OF THE INVENTION

Principles of the present invention provide techniques for creating a process nomenclature. An exemplary method (which may be computer-implemented) for creating a nomenclature to represent one or more groups within a process, according to one aspect of the invention, can include steps of obtaining a process, wherein the process comprises one or more groups, and creating a nomenclature to represent the one or more groups, wherein the nomenclature facilitates usability of the process in at least one of an operation and design environment.

In an embodiment of the invention, an exemplary method for generating a database of one or more processes, wherein each process is represented by a nomenclature includes the following steps. One or more processes are obtained, wherein each process comprises one or more groups. A nomenclature is created to represent the one or more groups, wherein the nomenclature facilitates usability of each process in at least one of an operation and design environment. The nomenclature is applied to each process. Also, each process is stored in a searchable database.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
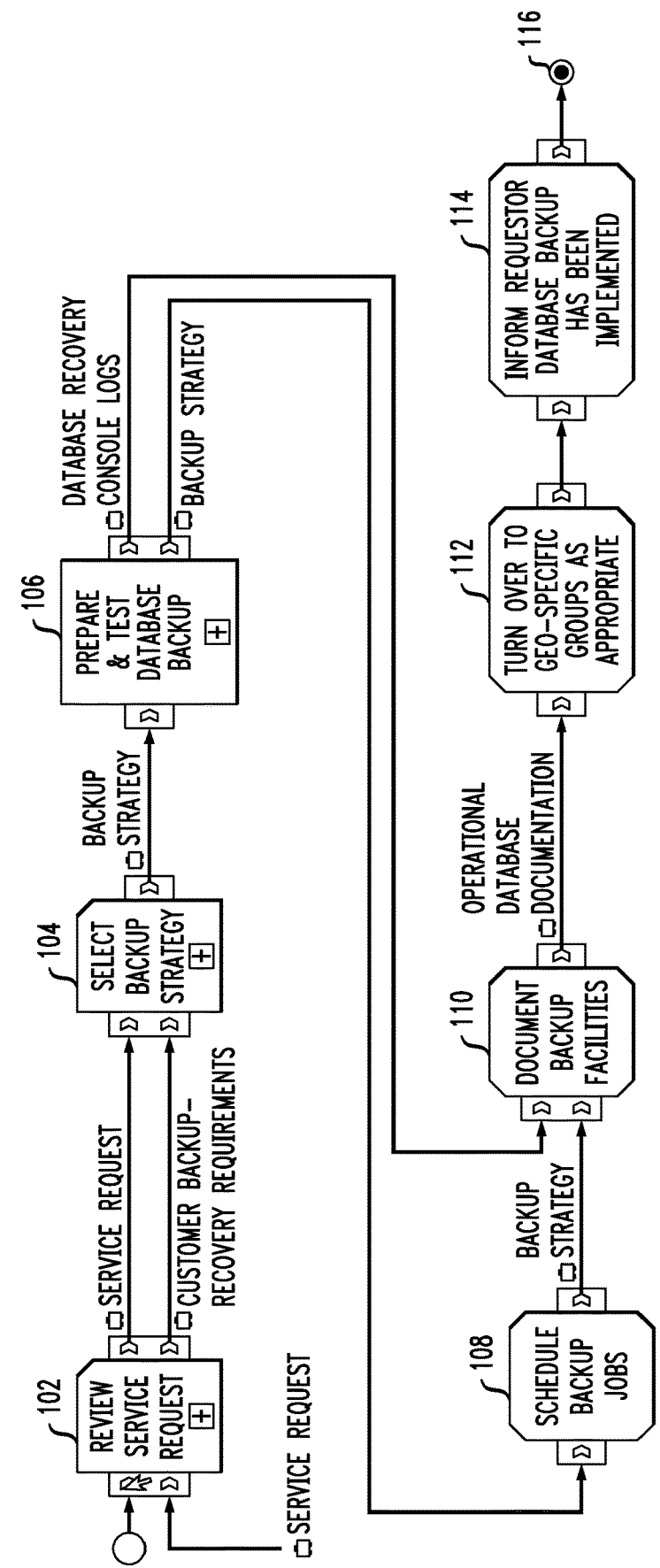
FIG. 1 is a diagram illustrating a skeletal presentation of current process and associated steps represented as information technology (IT) or enterprise processes, according to an embodiment of the present invention.

Principles of the present invention include nomenclature, discovery and overloading techniques for enterprise processes. As noted above, existing approaches include various inefficiencies. FIG. 1 is a diagram illustrating a skeletal presentation of current process and associated steps represented as IT or enterprise processes, according to an embodiment of the present invention. By way of illustration, FIG. 1 depicts a typical process chain with a number of sub-processes and tasks. At the highest level, any process constitutes a number of sub-processes which are typically in-line with any generic industrial and manufacturing process. FIG. 1 includes exemplary steps include reviewing a service request 102, selecting a backup strategy 104, preparing and testing a database backup 106, scheduling backup jobs 108, using document backup facilities 110, turning over to geo-specific control groups as appropriate 112 and informing the requestor that the database backup has been implemented 114. Element 116 represents the end of the above-described process.

Figure 2:
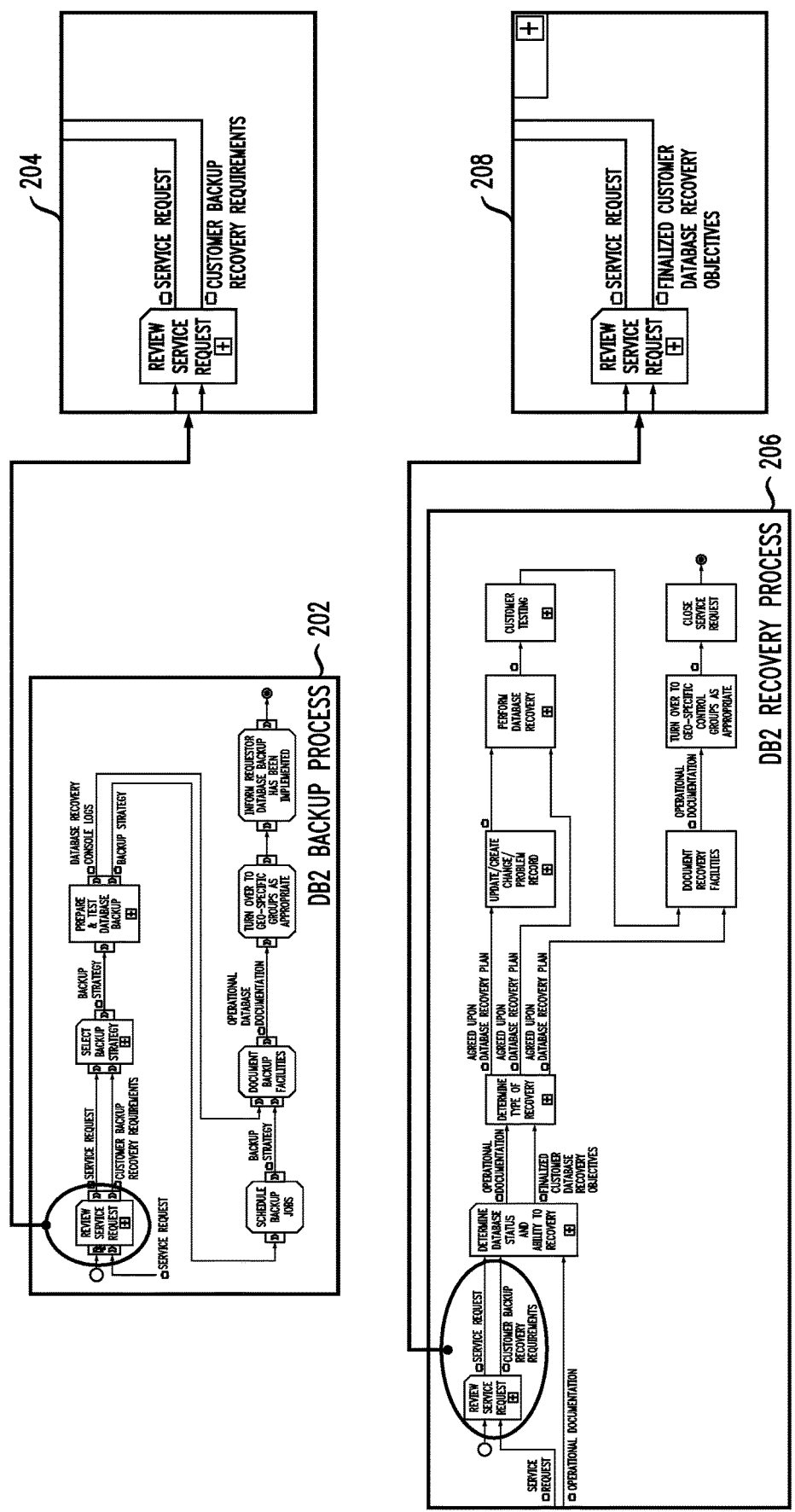
FIG. 2 is a diagram illustrating an exemplary information technology (IT) and/or enterprise process and associated attributes in a viewgraph format, according to an embodiment of the present invention.

FIG. 2 is a diagram illustrating an exemplary information technology (IT) and/or enterprise process and associated attributes in a viewgraph format, according to an embodiment of the present invention. By way of illustration, FIG. 2 depicts an example of existing conventions used to describe and/or represent IT processes through a combination of task names (for example, 202 and 206) associated outputs (for example, 204 and 208) such as, for example, service request, customer backup-recovery requirements and finalized customer database recovery objectives, which can be used as input for subsequent tasks.

However, the models are unable to provide a modular representation which could be comprehensive enough for a human reader as well as in a machine-readable format. In order to provide the details of the process, a model is required to have an xml translation of the model and needs the user to have programming expertise in that language or some of the similarly used formats. As depicted in FIG. 2, it is difficult to take each task as a cloned entity which can be used at various places right away from the graphical presentation. As a result, additional information and details need to be collected even before the same view graph or associated task(s) can be used for other purposes.

A service process nomenclature, as described herein, can include the following. One or more embodiments of the invention include diagramming and symbolic representation of a process, process chain or process-let for efficient representation and usability. Also, a hierarchy of words, numerals and/or symbols can be used to represent a task or a sub-process.

In one or more embodiments of the present invention, the input, output and role players can be represented as three distinct letters, numerals or any sort of visuals to signify that a process has a defined input, output and/or role players. Unique symbols such as, for example, '+', '−', '.' or '*' can be used by the processes and can be pluggable with another task and/or sub-process and/or process. Additionally, for example, a "@" sign can be used to represent specific constraints as requirements for the task and/or sub-process towards limiting it's usability for a focused set of constraints.

An exemplary end-to-end process chain can have "atleast" four sets of symbols and/or words and/or numerals to represent four basic steps of characteristics of a process. For example, the process model in FIG. 3A, which represents a typical task, can be represented by way of a skeletal representation following a general representation format of:

```
<Input>      <Input>      <Input>      <Input>
r<name1>.<symbol>.r<name2>.<symbol>.r<name3>.<symbol>.r<name4>
<Output>     <Output>     <Output>     <Output>
```

Figure 3A:
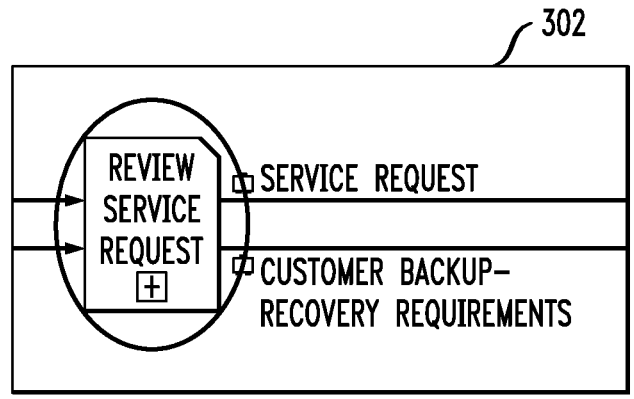
FIG. 3A is a diagram illustrating an exemplary process model, according to an embodiment of the present invention.
Figure 3B:
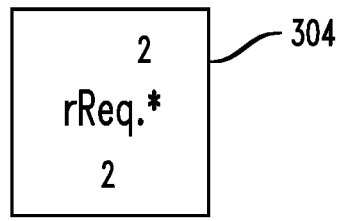
FIG. 3B is a diagram illustrating a process step, according to an embodiment of the present invention.

Also, once a model (for example, the model depicted in FIG. 3A) is translated into a skeletal representation, it can be represented by way of the symbolic notation depicted in FIG. 3B.

FIG. 3A is a diagram illustrating an exemplary process model 302, according to an embodiment of the present invention. FIG. 3B is a diagram illustrating a process step, according to an embodiment of the present invention. By way of illustration, FIG. 3B depicts a process step 304 having a role player represented as "r" with "Req" representing the process name (which can be, for example, part of a process dictionary stored elsewhere). Similarly, the two numbers "2" and "2" represent the two inputs and two outputs associated with the process step. As depicted above, a representation format may include, for example, a minimum of four sets of names representing a complete process chain, with <input>, <output>, and <r> each representing a number of inputs, outputs, and role players. Also, a name without any symbols before it can be considered a customer input or first task, while a name without having an end symbol can represents an end task. Further, if a task has sub-tasks, the sub-tasks can be represented with capital letters or any other convention to differentiate an indivisible task from a sub-process.

The benefits of the introduction of nomenclature within an enterprise process representation can include, for example, the following. Nomenclature significantly streamlines any process through a symbolic representation within an enterprise environment. Also, there are enterprise process nomenclatures available to prepare models. A process nomenclature, however, goes far beyond standards such as, for example, business process modeling notation (BPMN), to represent a self-contained towards usability and plugging-in a task and/or process in an operational environment.

A process nomenclature helps to constrain a set of words, symbols and/or phrases to represent groups within a process chain. Additionally, a standardized process nomenclature accelerates not only towards distinctly representing a process to be operationalized, but also as a modular way to split and reuse newly designed processes to meet customer-specific requirements. A process nomenclature can also help to distinguish generic tasks versus specific tasks, thus implicitly signifying the degree of automation and variability associated with the tasks. As such, a process nomenclature helps to concentrate on new task requirements for process design development, while helping over-arching stages of process optimization.

Figure 4:
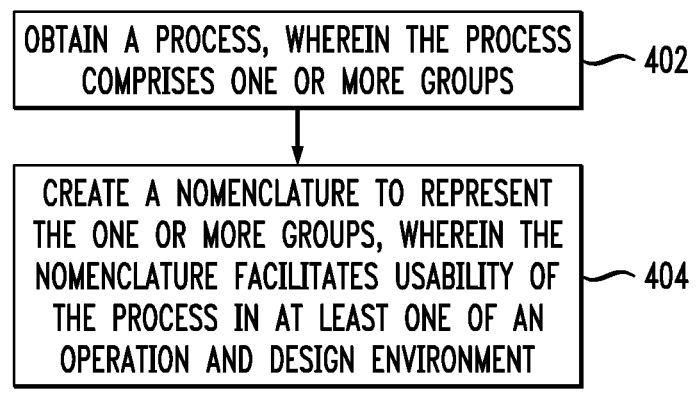
FIG. 4 is a flow diagram illustrating techniques for creating a nomenclature to represent one or more groups within a process, according to an embodiment of the present invention.

FIG. 4 is a flow diagram illustrating techniques for creating a nomenclature to represent one or more groups within a process, according to an embodiment of the present invention. Step 402 includes obtaining a process, wherein the process comprises one or more groups. The process can include, for example, an enterprise process. Step 404 includes creating a nomenclature to represent the one or more groups, wherein the nomenclature facilitates usability of the process in at least one of an operation and design environment. The nomenclature can include, for example, letters, words, numerals and/or symbols.

The groups can include, for example, tasks, sub-tasks, sub-processes, input, output, role players and/or enterprise process characteristics. For example, FIG. 2B includes two inputs and two outputs as the requirements, and similarly it has a well-defined role player represented as "r." Also, creating a nomenclature can include, for example, using symbols to be pluggable with a separate task, a separate process and/or a separate sub-process. Creating a nomenclature can also include using to represent a specific constraint as a requirement for a task and/or a sub-process.

The techniques depicted in FIG. 4 can also include identifying a group as a customer input and/or a first task if the group is not preceded by a nomenclature item. Also, a group can be identified as an end task if the group is not followed by a nomenclature item. One or more embodiments of the invention can also include modularly splitting and reusing a process to meet customer-specific requirements. For example, for any customer-specific requirement, a new notation can be added to the nomenclature such as, for example, "Cr" a part of the "Req" in FIG. 2B to address any specific requirements. The details of the Cr can, for example, be stored as a part of the local dictionary and/or global process requirement dictionary.

Also, one or more embodiments of the invention include enabling a dynamic plug-and-play feature to an enterprise process representation. A dynamic plug-and-play feature for a process and/or sub-process is similar to an audio file plug-and-play requirement used in other fields. If one has the process nomenclature defined and stored in a database, one can look for the process steps or a list of sub-processes and get the process entity from the process database or library to be plugged-in to take care of the execution of the process. A plug-and-play feature can be exploited through the use of links and/or pointers to the process steps within a library and/or database. Such a feature can save significant amounts of time and details while preparing process steps.

The nomenclature can also be used, for example, to define a specific nature of the process. A specific nature of a process can be defined, for example, by the attributes associated with a process. If one has the nature of the process annotations and hierarchy of process steps are taken care of, any process step would be self-contained to describe its nature and/or characteristics. Further, one or more embodiments of the invention can include operationalizing the process, including signatures for process automation and/or process customization. By way of operationalization, process signatures are described in terms of logical steps to carry out execution. As the characteristics and nature of the process are defined, they can be dynamically plugged-and-played, and the process would automatically satisfy towards achieving any automation. It can also distinctly tell if any customizations are required to satisfy the customer requirements.

Figure 5:
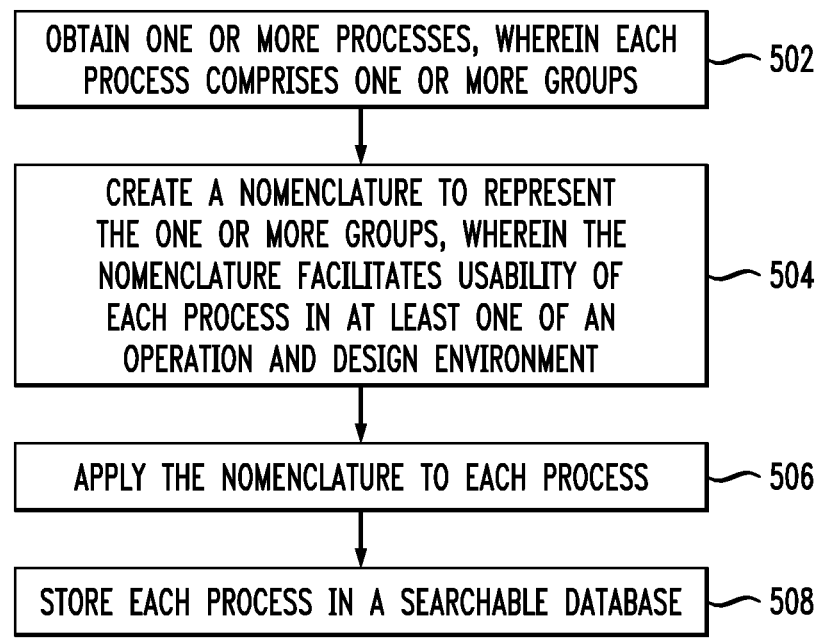
FIG. 5 is a flow diagram illustrating techniques for generating a database of one or more processes, wherein each process is represented by a nomenclature, according to an embodiment of the present invention.

FIG. 5 is a flow diagram illustrating techniques for generating a database of one or more processes, wherein each process is represented by a nomenclature, according to an embodiment of the present invention. Step 502 includes obtaining one or more processes, wherein each process comprises one or more groups. Step 504 includes creating a nomenclature to represent the one or more groups, wherein the nomenclature facilitates usability of each process in at least one of an operation and design environment. Step 506 includes applying the nomenclature to each process. Step 508 includes storing each process in a searchable database.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 6:
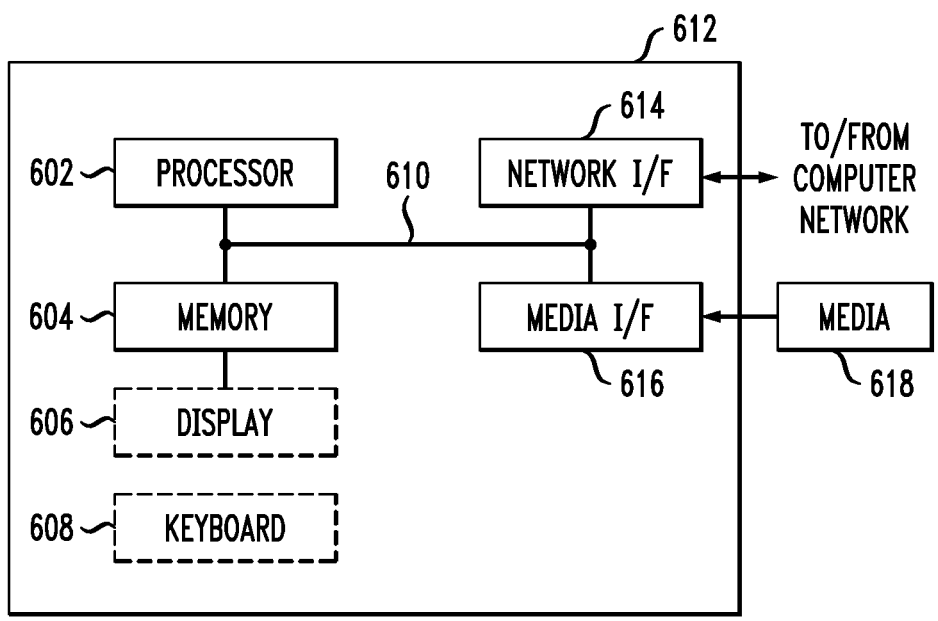
FIG. 6 is a system diagram of an exemplary computer system on which at least one embodiment of the present invention can be implemented.

At present, it is believed that the preferred implementation will make substantial use of software running on a general-purpose computer or workstation. With reference to FIG. 6, such an implementation might employ, for example, a processor 602, a memory 604, and an input and/or output interface formed, for example, by a display 606 and a keyboard 608. The term "processor" as used herein is intended to include any processing device, such as, for example, one that includes a CPU (central processing unit) and/or other forms of processing circuitry. Further, the terra "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 602, memory 604, and input and/or output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 604), magnetic tape, a removable computer diskette (for example, media 618), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuits) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, constraining a set of words, symbols and/or phrases to represent groups within a process chain.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating a database of one or more processes, wherein each process is represented by a nomenclature, comprising the steps of:
   obtaining one or more processes, wherein each process comprises an enterprise process comprising multiple groups, wherein the multiple groups comprise a plurality of one or more tasks, one or more sub-processes, an input, an output, one or more role players, and one or more enterprise process characteristics;
   creating a machine-readable nomenclature to represent the multiple groups, wherein the machine-readable nomenclature facilitates usability of the process by a hardware device in an operation environment and a design environment, and wherein creating the machine-readable nomenclature comprises creating a set of rules to:
   (i) represent one or more defined inputs of the process as a first symbol,
   (ii) represent one or more defined outputs of the process as a second symbol,
   (iii) represent one or more defined participants of the process as a third symbol, and
   (iv) represent one or more defined constraints of the process as a fourth symbol, wherein the one or more defined constraints comprise requirements for at least one of a task of the process and a sub-process of the process, wherein a group of the process is identifiable as one of a customer input and a first task if the group is not preceded by a nomenclature item, and wherein a group of the process is identifiable as an end task if the group is not followed by a nomenclature item;
   generating, automatically by at least one processor, a modular representation of a first process of the one or more processes, thereby enabling process automation related to the first process, wherein the at least one processor generates the modular representation by applying the set of rules of the machine-readable nomenclature to the first process;
   storing, by the at least one processor, the modular representation of the first process in a searchable database;
   using the machine-readable nomenclature to define a specific nature of the first process; and generating, automatically by the at least one processor, a modular representation of a different, second process, thereby enabling process automation related to the second process, by at least: accessing, by the at least one processor, the searchable database to identify a reusable part of the modular representation of the first process that is stored in the searchable database,
   retrieving, by the at least one processor, the reusable part of the modular representation of the first process from the searchable database, and
   plugging, by the at least one processor, the reusable part of the modular representation of the first process into the modular representation of the second process based on the created nomenclature.

2. A computer program product comprising a non-transitory computer readable recordable storage medium having computer readable program code for generating a database of one or more processes, wherein each process is represented by a nomenclature, said computer program product including:
   computer readable program code for obtaining one or more processes, wherein each process comprises an enterprise process comprising multiple groups, wherein the multiple groups comprise a plurality of one or more tasks, one or more sub-processes, an input, an output, one or more role players, and one or more enterprise process characteristics;
   computer readable program code for creating a machine-readable nomenclature to represent the multiple groups, wherein the machine-readable nomenclature facilitates usability of the process by a hardware device in an operation environment and a design environment, and wherein creating the machine-readable nomenclature comprises creating a set of rules to:
   (i) represent one or more defined inputs of the process as a first symbol,
   (ii) represent one or more defined outputs of the process as a second symbol
   (iii) represent one or more defined participants of the process as a third symbol, and
   (iv) represent one or more defined constraints of the process as a fourth symbol, wherein the one or more defined constraints comprise requirements for at least one of a task of the process and a sub-process of the process, wherein a group of the process is identifiable as one of a customer input and a first task if the group is not preceded by a nomenclature item, and wherein a group of the process is identifiable as an end task if the group is not followed by a nomenclature item;
   computer readable program code for causing at least one processor to automatically generate a modular representation of a first process of the one or more processes, thereby enabling process automation related to the first process, wherein the at least one processor generates the modular representation by applying the set of rules of the machine-readable nomenclature to the first process;
   computer readable program code for causing the at least one processor to store the modular representation of the first process in a searchable database;
   computer readable program code for using the machine-readable nomenclature to define a specific nature of the process; and
   computer readable program code for causing the at least one processor to automatically generate a modular representation of a different, second process, thereby enabling process automation related to the second process, by at least:
   accessing, by the at least one processor, the searchable database to identify a reusable part of the modular representation of the first process that is stored in the searchable database, retrieving, by the at least one processor, the reusable part of the modular representation of the first process from the searchable database, and plugging, by the at least one processor, the reusable part of the modular representation of the first process into the modular representation of the second process based on the created nomenclature.

3. An apparatus for generating a database of one or more processes, wherein each process is represented by a nomenclature, comprising:

a memory; and at least one processor coupled to said memory and operative to:

obtain one or more processes, wherein each process comprises an enterprise process comprising multiple groups, wherein the multiple groups comprise a plurality of one or more tasks, one or more sub-processes, an input, an output, one or more role players, and one or more enterprise process characteristics;

create a machine-readable nomenclature to represent the multiple groups, wherein the machine-readable nomenclature facilitates usability of the process by a hardware device in an operation environment and a design environment, and wherein creating the machine-readable nomenclature comprises creating a set of rules to:

(i) represent one or more defined inputs of the process as first symbol, (ii) represent one or more defined outputs of the process as a second symbol, (iii) represent one or more defined participants of the process as a third symbol, and (iv) represent one or more defined constraints of the process as a fourth symbol, wherein the one or more defined constraints comprise requirements for at least one of a task of the process and a sub-process of the process, wherein a group of the process is identifiable as one of a customer input and a first task if the group is not preceded by a nomenclature item, and wherein a group of the process is identifiable as an end task if the group is not followed by a nomenclature item;

automatically generate a modular representation of a first process of the one or more processes, thereby enabling process automation related to the first process, wherein the at least one processor generates the modular representation by applying the set of rules of the machine-readable nomenclature to the first process;

store the modular representation of the first process in a searchable database; and automatically generate a modular representation of a different, second process, thereby enabling process automation related to the second process, by at least:

accessing, by the at least one processor, the searchable database to identify a reusable part of the modular representation of the first process that is stored in the searchable database, retrieving, by the at least one processor, the reusable part of the modular representation of the first process from the searchable database, and plugging, by the at least one processor, the reusable part of the modular representation of the first process into the modular representation of the second process based on the created nomenclature.

\* \* \* \* \*